US011859865B2

(12) United States Patent
Goyal et al.

(10) Patent No.: US 11,859,865 B2
(45) Date of Patent: Jan. 2, 2024

(54) TANKLESS WATER HEATER MANIFOLD SYSTEM

(71) Applicant: Rinnai America Corporation, Peachtree City, GA (US)

(72) Inventors: Rahul Natwar Goyal, Peachtree City, GA (US); Dennis Ryan McMichael, Jr., Sharpsburg, GA (US)

(73) Assignee: Rinnai America Corporation, Peachtree City, GA (US)

( * ) Notice: Subject to any disclaimer, the term of this patent is extended or adjusted under 35 U.S.C. 154(b) by 0 days.

(21) Appl. No.: 17/546,822

(22) Filed: Dec. 9, 2021

(65) Prior Publication Data

US 2022/0186978 A1 Jun. 16, 2022

Related U.S. Application Data

(60) Provisional application No. 63/123,764, filed on Dec. 10, 2020.

(51) Int. Cl.
*F24H 1/00* (2022.01)
*F24H 1/12* (2022.01)
(Continued)

(52) U.S. Cl.
CPC .............. *F24H 1/124* (2013.01); *F23K 5/005* (2013.01); *F24H 1/0072* (2013.01); *F24H 9/06* (2013.01); *F24H 9/139* (2022.01)

(58) Field of Classification Search
CPC ........ F24H 1/124; F24H 9/139; F24H 1/0072; F24H 9/06; F24H 9/12; F24H 9/13;
(Continued)

(56) References Cited

U.S. PATENT DOCUMENTS 4,550,689 A * 11/1985 Wolter .................... F24H 1/165
122/18.4
4,917,077 A * 4/1990 Scanferla .................. F24H 9/14
126/344

(Continued)

FOREIGN PATENT DOCUMENTS

DE 10057943 B4 * 10/2007 ............. F24H 9/142
EP 1918648 A2 * 5/2008 ............... F24H 9/06
(Continued)

OTHER PUBLICATIONS

EP-1918648-A2 machine translation (Year: 2022).*

*Primary Examiner* — Steven S Anderson, II
(74) *Attorney, Agent, or Firm* — Quinn IP Law

(57) ABSTRACT

Various implementations include a hot water heating system having a spine and two or more water heating units. The spine includes a top surface defining one or more top openings, two or more coupling areas, and cold water, hot water, and fuel manifolds. One or more top openings provide access to a cold water manifold inlet, a hot water manifold outlet, and a fuel manifold inlet. At least one of the coupling areas is located above another coupling area when the spine is oriented with the top surface facing upwardly. The water heating units are coupled to coupling areas such that a cold water inlet of the unit is fluidically coupled to the cold water manifold outlet, a hot water outlet of the unit is fluidically coupled to the hot water manifold inlet, and a fuel inlet of the unit is fluidically coupled to the fuel manifold outlet.

18 Claims, 5 Drawing Sheets

(51) Int. Cl.
    *F24H 9/06* (2006.01)
    *F24H 9/13* (2022.01)
    *F23H 5/00* (2006.01)
    *F23K 5/00* (2006.01)

(58) Field of Classification Search
    CPC . F24H 9/14; F24H 9/142; F23K 5/005; F24D 3/1066
    USPC .......................................................... 122/17.1
    See application file for complete search history.

(56) References Cited

U.S. PATENT DOCUMENTS

| | | | | |
|---|---|---|---|---|
| 5,366,152 | A * | 11/1994 | Gossi | F24D 11/0214 62/238.7 |
| 7,460,769 | B2 * | 12/2008 | Ryks | F24H 9/06 392/441 |
| 8,397,709 | B1 * | 3/2013 | Pleva | E04H 4/129 126/374.1 |
| 9,562,697 | B2 * | 2/2017 | Ng | F24H 9/139 |
| 2003/0056826 | A1 * | 3/2003 | Thomas | E03C 1/02 137/360 |

FOREIGN PATENT DOCUMENTS

| | | | | | |
|---|---|---|---|---|---|
| EP | 2093515 | A1 * | 8/2009 | ............. | F24H 9/142 |
| FR | 2971530 | A1 * | 8/2012 | ............... | F24H 9/06 |
| GB | 2359873 | A * | 9/2001 | ............... | F24H 9/06 |
| WO | WO-2019007623 | A1 * | 1/2019 | ............... | F24H 9/06 |

\* cited by examiner

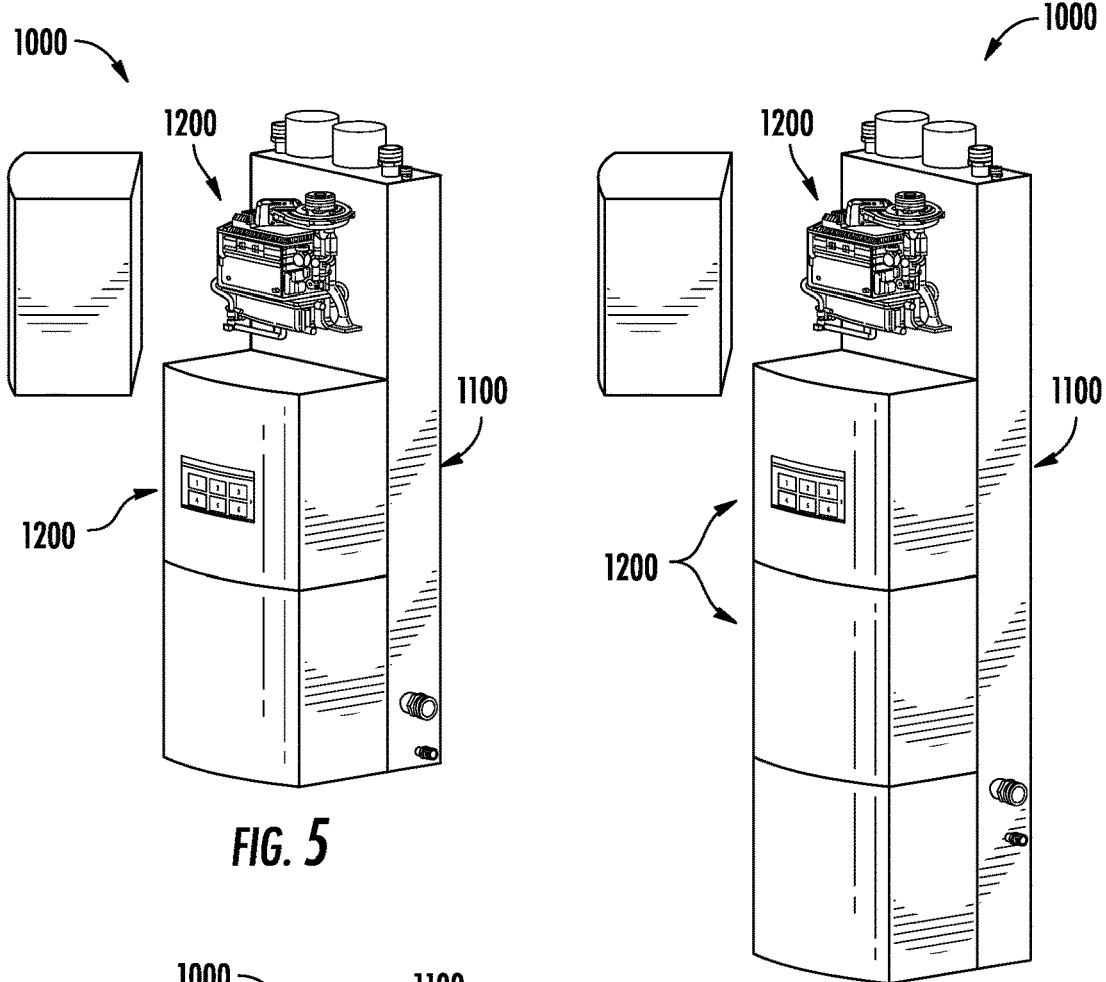
FIG. 5
FIG. 6
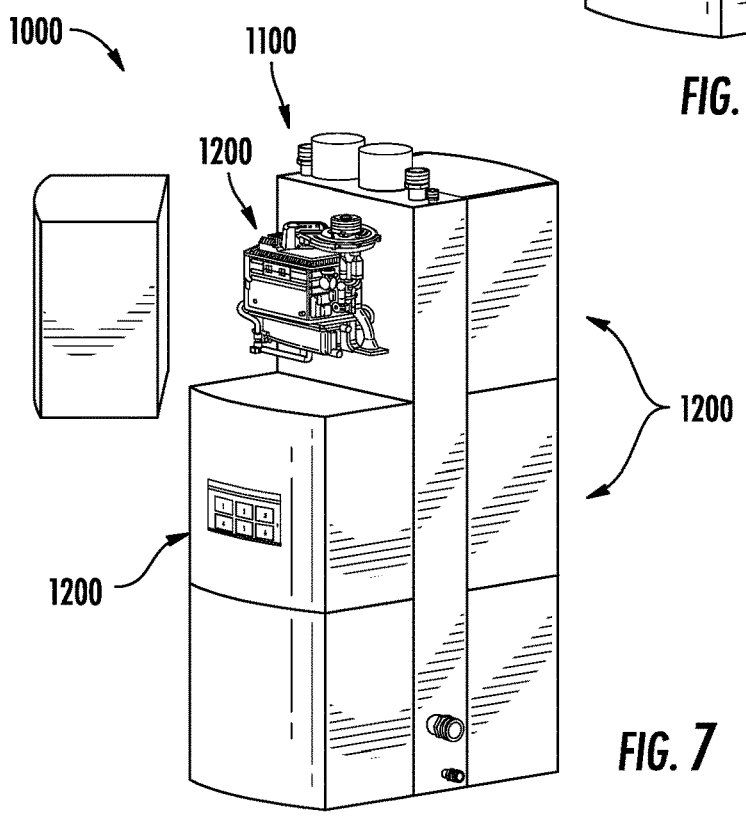
FIG. 7

TANKLESS WATER HEATER MANIFOLD SYSTEM

CROSS-REFERENCE TO RELATED APPLICATIONS

This application claims the benefit of U.S. Provisional Patent Application No. 63/123,764, filed Dec. 10, 2020, the content of which is incorporated herein by reference in its entirety.

BACKGROUND

Current water heating systems often include one water heating unit that is sized for providing hot water for a specific need, such as a house, a building, a residential unit, etc. The larger sizes of the water heating unit in these systems are subject to additional regulations, adding to the cost of the system and installation. Some heating systems have been developed to include multiple smaller water heating units to avoid these regulations, but the multiple water heaters occupy a large footprint within a mechanical room.

Thus, there is a need for a water heating system that is not subject to additional regulations that does not have a relatively large footprint.

SUMMARY

Various implementations include a hot water heating system. The system includes a spine and two or more water heating units. The spine includes a top surface, two or more coupling areas, a cold water manifold, a hot water manifold, and a fuel manifold. The top surface defines one or more top openings. The two or more coupling areas are for coupling a water heating unit to the spine. Each of the coupling areas includes a cold water manifold outlet, a hot water manifold inlet, and a fuel manifold outlet. The cold water manifold includes a cold water manifold inlet fluidically coupled to the cold water manifold outlet of each coupling area. One or more top openings provide access to the cold water manifold inlet. The hot water manifold includes a hot water manifold outlet fluidically coupled to the hot water manifold inlet of each coupling area. One or more top openings provide access to the hot water manifold outlet. The fuel manifold includes a fuel manifold inlet in communication with the fuel manifold outlet of each coupling area. One or more top openings provide access to the fuel manifold inlet. At least one of the coupling areas is located above another coupling area when the spine is oriented with the top surface facing upwardly. Each of the water heating units is coupled to one of the coupling areas. Each water heating unit includes a cold water inlet fluidically coupled to the cold water manifold outlet at a corresponding one of the coupling areas, a hot water outlet fluidically coupled to the hot water manifold inlet at the corresponding one of the coupling areas, and a fuel inlet fluidically coupled to the fuel manifold outlet at the corresponding one of the coupling areas.

In some implementations, the spine includes two coupling surfaces. Each of the two coupling surfaces defines at least two coupling areas.

In some implementations, each water heating unit includes a back panel coupled to one of the coupling areas. The back panel defines one or more openings configured such that each of the one or more openings provides access to one or more of the cold water manifold outlet, the hot water manifold inlet, and the fuel manifold outlet of the corresponding one of the coupling areas. In some implementations, each water heating unit includes a cover panel coupled to the back panel. The cover panel is formed separately from the cover panels of the other water heating units.

In some implementations, the spine further includes an air supply manifold and a gas exhaust manifold, and each water heating unit further includes an air inlet and a gas exhaust outlet. The air supply manifold includes an air supply manifold inlet fluidically coupled to an air supply manifold outlet of each coupling area. The gas exhaust manifold includes a gas exhaust manifold outlet fluidically coupled to a gas exhaust manifold inlet of each coupling area. The air inlet is fluidically coupled to the air supply manifold outlet at a corresponding one of the coupling areas. The gas exhaust outlet is fluidically coupled to the gas exhaust manifold inlet at a corresponding one of the coupling areas.

In some implementations, the spine further includes an electric supply manifold that includes an electric manifold inlet and is adapted to provide electrical power to each coupling area. Each water heating unit is configured to be electrically coupled to the electric supply manifold at a corresponding one of the coupling areas.

In some implementations, the spine further includes a condensate manifold including a condensate manifold outlet fluidically coupled to a condensate manifold inlet of each coupling area. Each water heating unit further includes a condensate outlet fluidically coupled to the condensate manifold inlet at a corresponding one of the coupling areas.

In some implementations, the two or more coupling areas includes two coupling areas.

In some implementations, the two or more coupling areas includes three coupling areas.

In some implementations, the two or more coupling areas includes four coupling areas.

In some implementations, the two or more coupling areas includes five coupling areas.

In some implementations, the two or more coupling areas includes six coupling areas.

In some implementations, each of the two or more water heating units is rated for less than 200,000 BTU.

Various other implementations include a water heating unit. The unit includes a back panel and a water heater. The back panel is configured to be coupled to a surface. The water heater is coupled to the back panel. The water heater includes a cold water inlet, a hot water outlet, and a fuel inlet. The back panel defines one or more openings configured such that each of the one or more openings provides access to one or more of a cold water manifold outlet, a hot water manifold inlet, and a fuel manifold outlet of the surface when the back panel is coupled to the surface.

In some implementations, the water heater further includes an air inlet and a gas exhaust outlet. The one or more openings are configured such that each of the one or more openings provides access to one or more of an air supply manifold outlet and a gas exhaust manifold inlet of the surface when the back panel is coupled to the surface.

In some implementations, the water heater is configured to be electrically coupled to an electric supply manifold, and the one or more openings are configured such that each of the one or more openings provides access to the electric supply manifold when the back panel is coupled to the surface.

In some implementations, the water heater further includes a condensate outlet, and the one or more openings are configured such that each of the one or more openings provides access to a condensate manifold inlet of the surface when the back panel is coupled to the surface In some implementations, the water heater further includes a cover panel coupled to the back panel.

In some implementations, the back panel and cover panel at least partially define a cavity and the water heater is disposed within the cavity.

In some implementations, the water heating unit is rated for less than 200,000 BTU.

Various other implementations include a spine for a hot water heating system. The spine includes a top surface, two or more coupling areas, a cold water manifold, a hot water manifold, and a fuel manifold. The top surface defines one or more top openings. The two or more coupling areas are for coupling a water heating unit to the spine. Each of the coupling areas includes a cold water manifold outlet, a hot water manifold inlet, and a fuel manifold outlet. The cold water manifold includes a cold water manifold inlet fluidically coupled to the cold water manifold outlet of each coupling area. One or more top openings provide access to the cold water manifold inlet. The hot water manifold includes a hot water manifold outlet fluidically coupled to the hot water manifold inlet of each coupling area. One or more top openings provide access to the hot water manifold outlet. The fuel manifold includes a fuel manifold inlet in communication with the fuel manifold outlet of each coupling area. One or more top openings provide access to the fuel manifold inlet. At least one of the coupling areas is located above another coupling area when the spine is oriented with the top surface facing upwardly.

In some implementations, the spine further includes two coupling surfaces. Each of the two coupling surfaces defines at least two coupling areas.

In some implementations, each coupling area is configured to be coupled to a back panel of the water heating unit such that each of one or more openings defined by the back panel provides access to one or more of the cold water manifold outlet, the hot water manifold inlet, and the fuel manifold outlet of the corresponding one of the coupling areas.

In some implementations, the spine further includes an air supply manifold including an air supply manifold inlet fluidically coupled to an air supply manifold outlet of each coupling area and a gas exhaust manifold including a gas exhaust manifold outlet fluidically coupled to a gas exhaust manifold inlet of each coupling area.

In some implementations, the spine further includes an electric supply manifold that includes an electric supply manifold inlet and is adapted to provide electrical power to each coupling area.

In some implementations, the spine further includes a condensate manifold including a condensate manifold outlet fluidically coupled to a condensate manifold inlet of each coupling area.

In some implementations, the two or more coupling areas includes two coupling areas.

In some implementations, the two or more coupling areas includes three coupling areas.

In some implementations, the two or more coupling areas includes four coupling areas.

In some implementations, the two or more coupling areas includes five coupling areas.

In some implementations, the two or more coupling areas includes six coupling areas.

Various other implementations include a method of assembling a hot water heating system. The method includes mounting the spine described above to a floor or wall, fluidically coupling the cold water manifold inlet to a cold water supply source, fluidically coupling the hot water manifold outlet to a hot water supply source, fluidically coupling the fuel manifold inlet to a fuel supply source, and coupling two or more of the water heating units described above to the spine such that each of the water heating units is coupled to one of the coupling areas and the cold water inlet is fluidically coupled to the cold water manifold outlet at a corresponding one of the coupling areas, the hot water outlet is fluidically coupled to the hot water manifold inlet at the corresponding one of the coupling areas, and the fuel inlet is fluidically coupled to the fuel manifold outlet at the corresponding one of the coupling areas.

In some implementations, the spine includes two coupling surfaces. Each of the two coupling surfaces defines at least two coupling areas.

In some implementations, each water heating unit includes a back panel coupled to one of the coupling areas. The back panel defines one or more openings configured such that each of the one or more openings provides access to one or more of the cold water manifold outlet, the hot water manifold inlet, and the fuel manifold outlet of the corresponding one of the coupling areas.

In some implementations, each water heating unit includes a cover panel coupled to the back panel. The cover panel is formed separately from the cover panels of the other water heating units.

In some implementations, the spine further includes an air supply manifold and a gas exhaust manifold, and each water heating unit further includes an air inlet and a gas exhaust outlet. The air supply manifold includes an air supply manifold inlet fluidically coupled to an air supply manifold outlet of each coupling area. The gas exhaust manifold includes a gas exhaust manifold outlet fluidically coupled to a gas exhaust manifold inlet of each coupling area. The air inlet is fluidically coupled to the air supply manifold outlet at a corresponding one of the coupling areas. The gas exhaust outlet is fluidically coupled to the gas exhaust manifold inlet at a corresponding one of the coupling areas.

In some implementations, the spine further includes an electric supply manifold that includes an electric manifold inlet and is adapted to provide electrical power to each coupling area. Each water heating unit is configured to be electrically coupled to the electric supply manifold at a corresponding one of the coupling areas.

In some implementations, the spine further includes a condensate manifold including a condensate manifold outlet fluidically coupled to a condensate manifold inlet of each coupling area. Each water heating unit further includes a condensate outlet fluidically coupled to the condensate manifold inlet at a corresponding one of the coupling areas.

In some implementations, the two or more coupling areas includes two coupling areas.

In some implementations, the two or more coupling areas includes three coupling areas.

In some implementations, the two or more coupling areas includes four coupling areas.

In some implementations, the two or more coupling areas includes five coupling areas.

In some implementations, the two or more coupling areas includes six coupling areas.

In some implementations, each of the two or more water heating units is rated for less than 200,000 BTU.

BRIEF DESCRIPTION OF DRAWINGS

Example features and implementations are disclosed in the accompanying drawings. However, the present disclosure is not limited to the precise arrangements and instrumentalities shown.

FIG. 5 is a perspective view of a hot water heating system with one coupling surface, two coupling areas, and two water heating units, according to another implementation.

FIG. 6 is a perspective view of a hot water heating system with one coupling surface, three coupling areas, and three water heating units, according to another implementation.

FIG. 7 is a perspective view of a hot water heating system with two coupling surface, four coupling areas, and four water heating units, according to another implementation.

DETAILED DESCRIPTION

Figure 1:
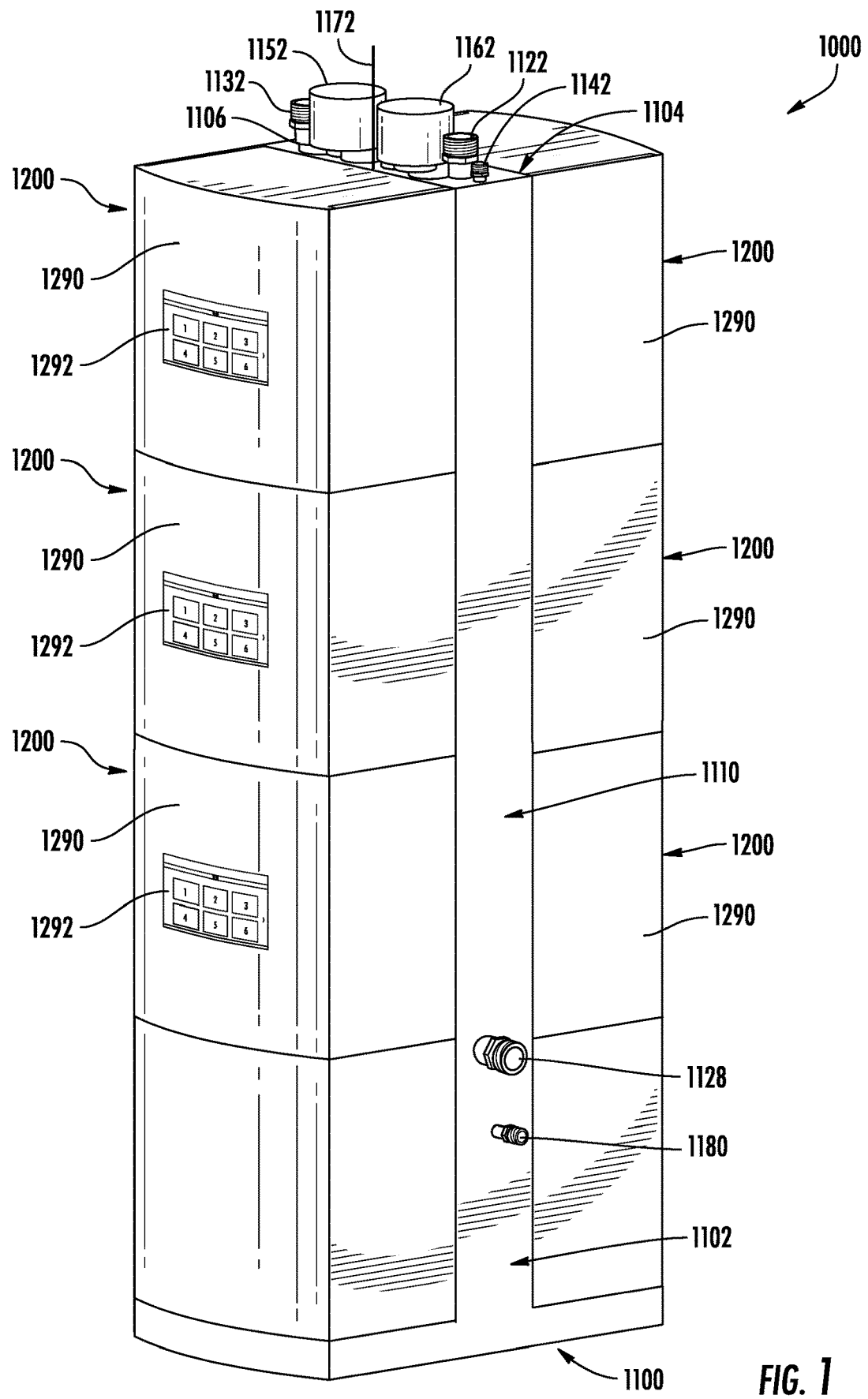
FIG. 1 is a perspective view of a hot water heating system, according to one implementation.

The devices, systems, and methods described herein include hot water heating systems that include individual vertically stacked water heating units and a spine. The water heating units are each coupled to a different coupling area of the spine. The devices, systems, and methods described herein provide for many benefits over the prior art. Because the water, air, exhaust, fuel, and electric manifold lines contained within the spine extend through the top surface of the spine, rather than through the back of the unit like in many current systems, the hot water heating systems described herein are able to be mounted against a wall without the need for utilities being run through the wall. The vertical stacking of the individual water heating units also allows multiple water heating units to occupy a relatively small footprint. Furthermore, because each of the water heating units is an individual, self-contained unit plumbed to a common spine, each of the water heating units is considered a separate unit for regulation purposes.

Various implementations include a hot water heating system. The system includes a spine and two or more water heating units. The spine includes a top surface, two or more coupling areas, a cold water manifold, a hot water manifold, and a fuel manifold. The top surface defines one or more top openings. The two or more coupling areas are for coupling a water heating unit to the spine. Each of the coupling areas includes a cold water manifold outlet, a hot water manifold inlet, and a fuel manifold outlet. The cold water manifold includes a cold water manifold inlet fluidically coupled to the cold water manifold outlet of each coupling area. One or more top openings provide access to the cold water manifold inlet. The hot water manifold includes a hot water manifold outlet fluidically coupled to the hot water manifold inlet of each coupling area. One or more top openings provide access to the hot water manifold outlet. The fuel manifold includes a fuel manifold inlet in communication with the fuel manifold outlet of each coupling area. One or more top openings provide access to the fuel manifold inlet. At least one of the coupling areas is located above another coupling area when the spine is oriented with the top surface facing upwardly. Each of the water heating units is coupled to one of the coupling areas. Each water heating unit includes a cold water inlet fluidically coupled to the cold water manifold outlet at a corresponding one of the coupling areas, a hot water outlet fluidically coupled to the hot water manifold inlet at the corresponding one of the coupling areas, and a fuel inlet fluidically coupled to the fuel manifold outlet at the corresponding one of the coupling areas.

Various other implementations include a water heating unit. The unit includes a back panel and a water heater. The back panel is configured to be coupled to a surface. The water heater is coupled to the back panel. The water heater includes a cold water inlet, a hot water outlet, and a fuel inlet. The back panel defines one or more openings configured such that each of the one or more openings provides access to one or more of a cold water manifold outlet, a hot water manifold inlet, and a fuel manifold outlet of the surface when the back panel is coupled to the surface.

Various other implementations include a spine for a hot water heating system. The spine includes a top surface, two or more coupling areas, a cold water manifold, a hot water manifold, and a fuel manifold. The top surface defines one or more top openings. The two or more coupling areas are for coupling a water heating unit to the spine. Each of the coupling areas includes a cold water manifold outlet, a hot water manifold inlet, and a fuel manifold outlet. The cold water manifold includes a cold water manifold inlet fluidically coupled to the cold water manifold outlet of each coupling area. One or more top openings provide access to the cold water manifold inlet. The hot water manifold includes a hot water manifold outlet fluidically coupled to the hot water manifold inlet of each coupling area. One or more top openings provide access to the hot water manifold outlet. The fuel manifold includes a fuel manifold inlet in communication with the fuel manifold outlet of each coupling area. One or more top openings provide access to the fuel manifold inlet. At least one of the coupling areas is located above another coupling area when the spine is oriented with the top surface facing upwardly.

Various other implementations include a method of assembling a hot water heating system. The method includes mounting the spine described above to a floor or wall, fluidically coupling the cold water manifold inlet to a cold water supply source, fluidically coupling the hot water manifold outlet to a hot water supply source, fluidically coupling the fuel manifold inlet to a fuel supply source, and coupling two or more of the water heating units described above to the spine such that each of the water heating units is coupled to one of the coupling areas and the cold water inlet is fluidically coupled to the cold water manifold outlet at a corresponding one of the coupling areas, the hot water outlet is fluidically coupled to the hot water manifold inlet at the corresponding one of the coupling areas, and the fuel inlet is fluidically coupled to the fuel manifold outlet at the corresponding one of the coupling areas.

FIGS. 1-4 show a hot water heating system 1000 according to one implementation. As shown in FIG. 1, the system 1000 includes a spine 1100 and six individual water heating units 1200.

Figure 2:
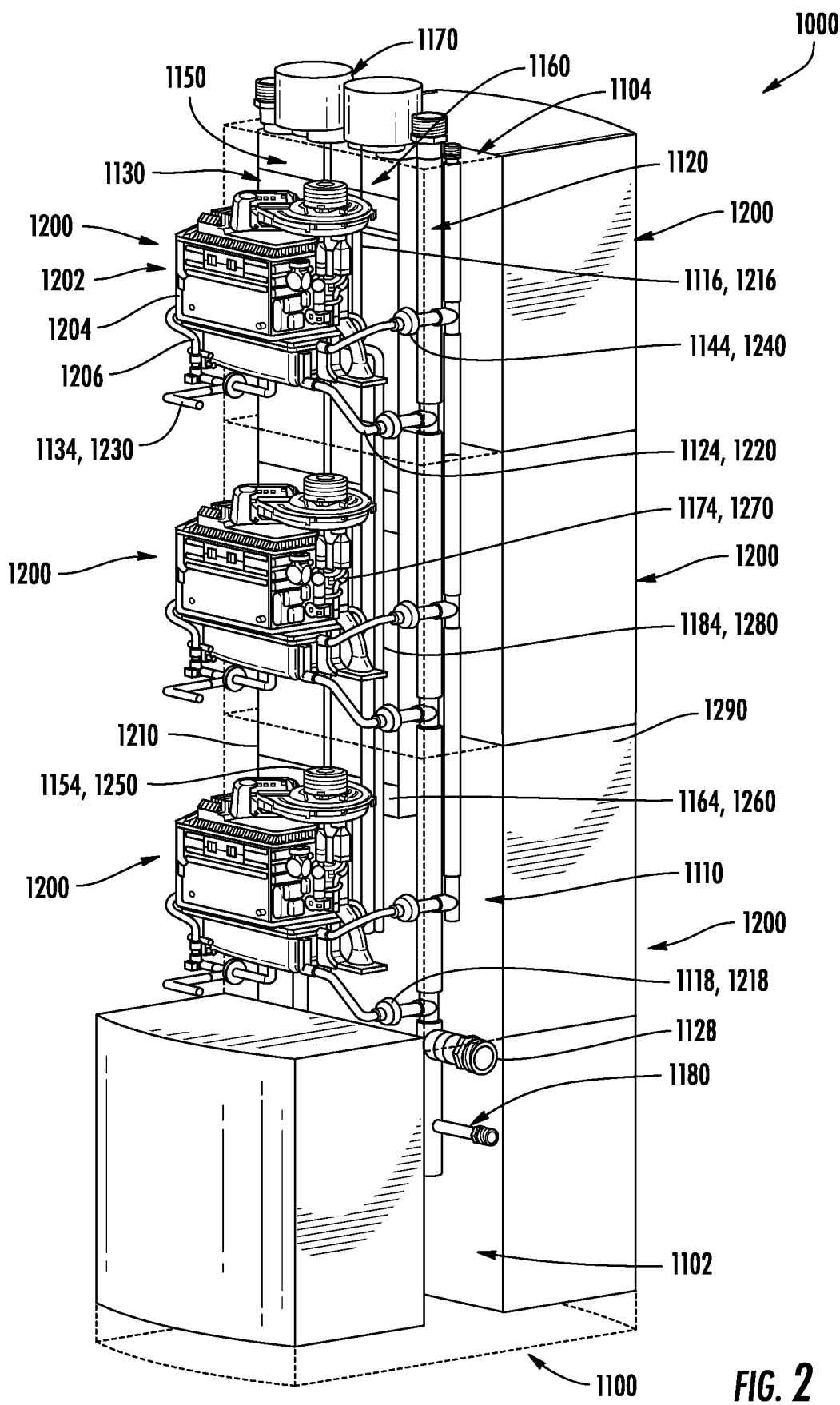
FIG. 2 is a perspective view of the hot water heating system of FIG. 1 with the cover panels removed from three of the water heating units.

FIG. 2 shows the hot water heating system 1000 of FIG. 1 with cover panels 1290 removed from three hot water heating units 1200 of one coupling surface 1112 and the spine 1100 shown transparently. The spine 1100 includes a central portion 1110, a base 1102, and a top surface 1104 that defines five top openings 1106. The terms "top," "base," "side," and other similar directional terms, as used herein, describe directions relative to the orientations of the examples shown in the figures. For instance, the "top surface 1104" refers to the upper surface of the spine 1100 when the spine 1100 is oriented with the top surface 1104 facing upwardly. The center portion defines two coupling surfaces 1112 located opposite and spaced apart from each other. Each of the two coupling surfaces 1112 defines three vertically aligned coupling areas 1114 such that at least one of the coupling areas 1114 is located above another coupling area 1114 when the spine 1100 is oriented with the top surface 1104 facing upwardly. One of the six water heating units 1200 is coupled to each of the six coupling areas 1114 of the spine 1100. The vertical orientation of the modular water heating units 1200 coupled to the spine 1100 allow for a configurable hot water heating system 1000 with a relatively small footprint.

Although the spine 1100 shown in FIGS. 1-4 includes two coupling surfaces 1112 that are opposite and spaced apart from each other, in other implementations, the spine 5100 of the system 5000 includes one coupling surface 5112 (as shown in FIGS. 5 and 6) or more than two coupling surfaces. In these implementations, the coupling surfaces 5112 are oriented such that at least one of the coupling areas 5114 is located above another coupling area 5114 when the spine 5100 is oriented with the top surface 5104 facing upwardly but can be located in any way relative to each other. In other implementations, the coupling surfaces 1112 include two (FIG. 5), three (FIG. 6), four (FIG. 7), five, or six or more coupling areas 1114 that are oriented such that at least one of the coupling areas 1114 is located above another coupling area 1114 when the spine 1100 is oriented with the top surface 1104 facing upwardly. Although the top surface 1104 of the spine 1100 shown in FIGS. 1-4 includes five top openings 1106, in other implementations, the top surface includes any number of top openings and portions of one or more manifolds extends through each top opening. Although the system 1000 shown in FIGS. 1-4 is mounted with the base 1102 of the spine 1100 against the ground and the top surface 1104 oriented upwardly, in other implementations, the system is mounted to a wall or any other supporting apparatus such that the base of the spine is not touching the ground and the top surface 1104 is oriented upwardly.

Figure 3:
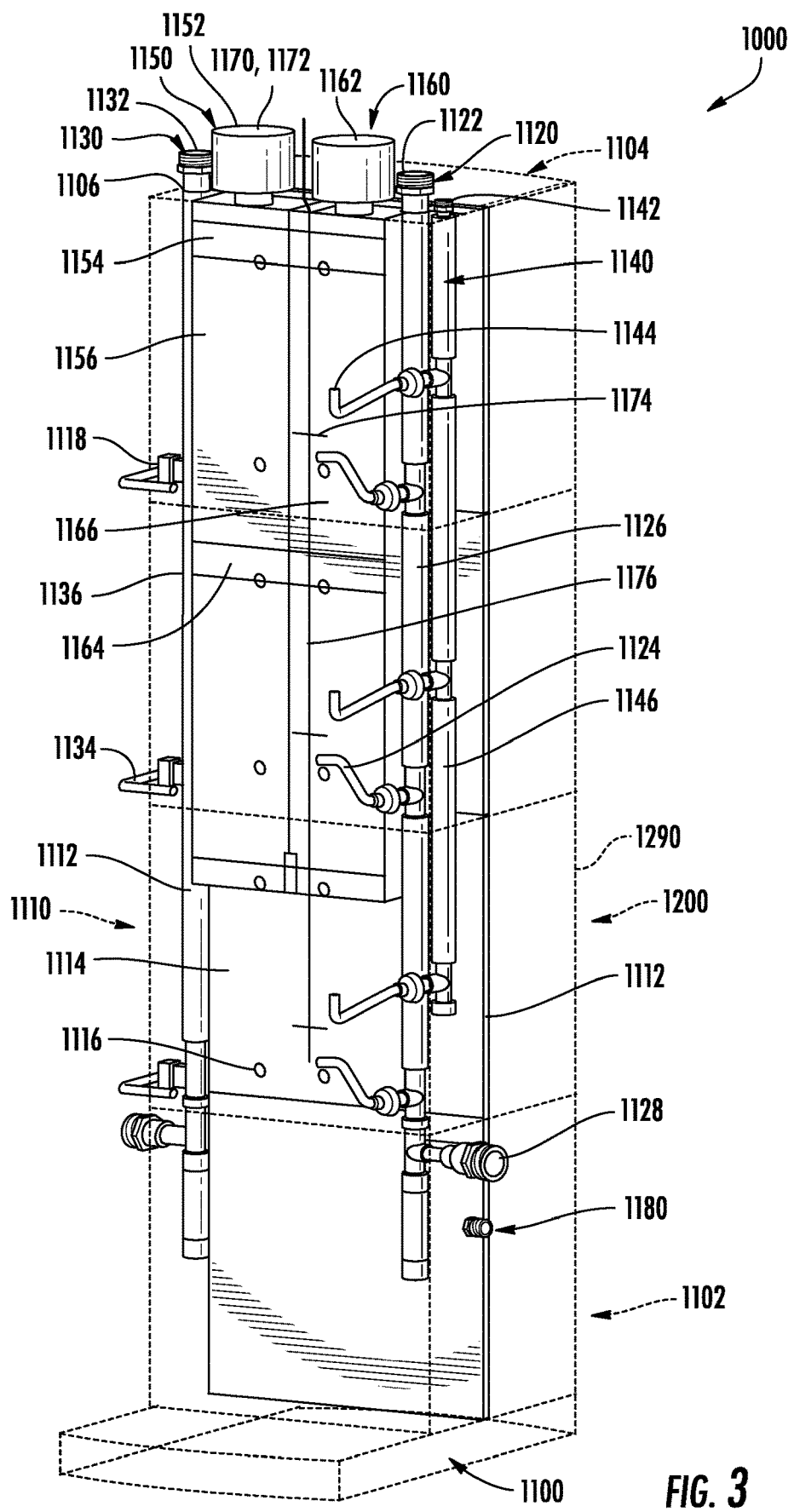
FIG. 3 is a perspective view of the hot water heating system of FIG. 1 with three of the water heating units removed from a coupling surface.
Figure 4:
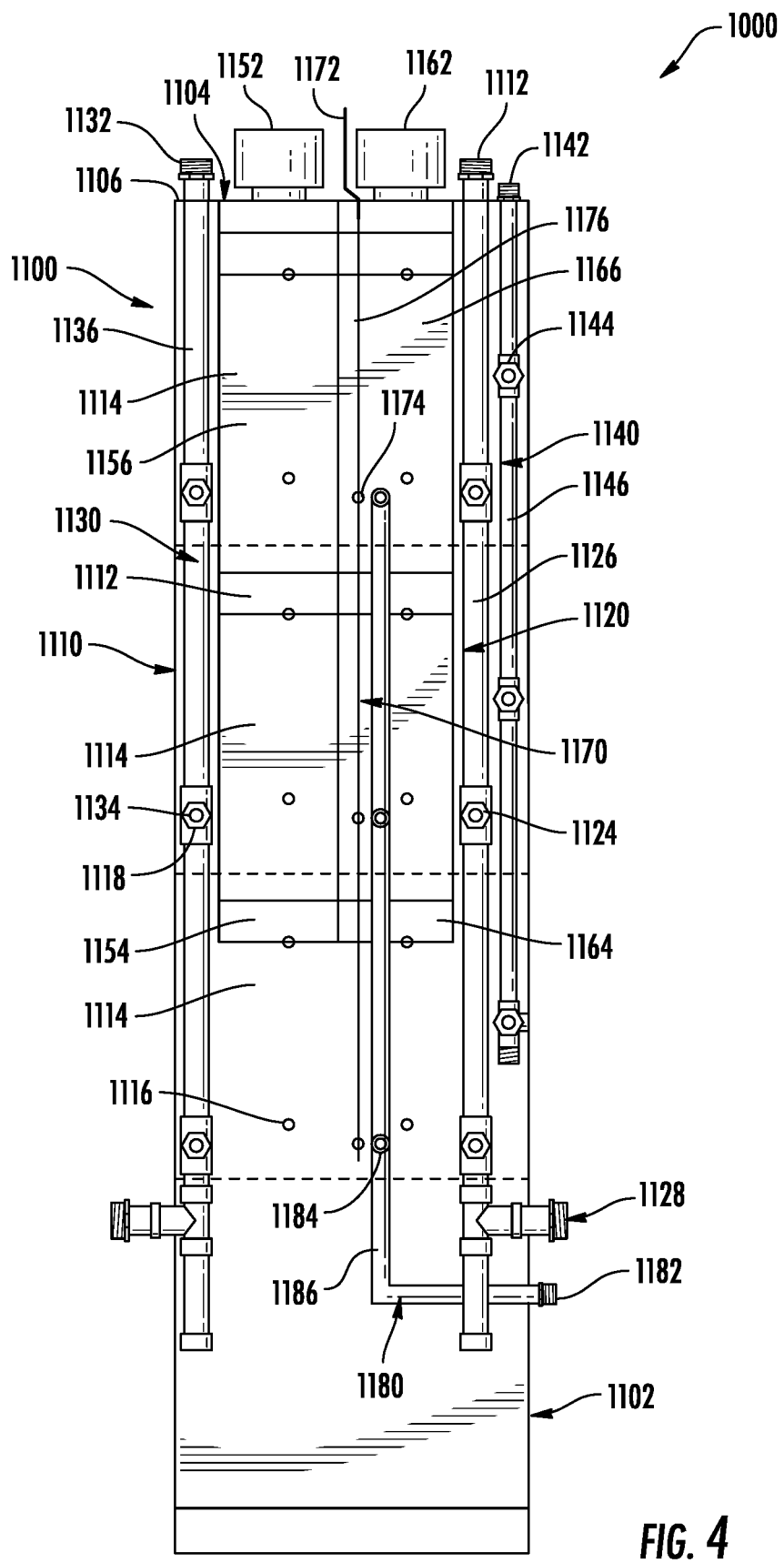
FIG. 4 is a cross-sectional view of the hot water heating system of FIG. 3 as viewed from line 4-4.

FIG. 3 shows the hot water heating system 1000 of FIG. 1 with the three hot water heating units 1200 removed from one of the coupling surfaces 1112 and the spine 1100 shown transparently. FIG. 4 shows cross-section 4-4 of the hot water heating system 1000 of FIG. 3. The central portion 1110 of the spine 1100 includes a cold water manifold 1120, a hot water manifold 1130, a fuel manifold 1140, an air supply manifold 1150, a gas exhaust manifold 1160, an electric supply manifold 1170, and a condensate manifold 1180.

The cold water manifold 1120 includes a cold water manifold inlet 1122 and six cold water manifold outlets 1124 fluidically coupled to each other by a cold water manifold line 1126. The cold water manifold inlet 1122 extends through one of the top openings 1106 defined by the top surface 1104, and the cold water manifold line 1126 extends through the central portion 1110 of the spine 1100. Each of the six cold water manifold outlets 1124 branch off of the cold water manifold line 1126 and extends through a coupling area opening 1118 defined by one of the coupling areas 1114 of the spine 1100.

An additive water connection 1128 is fluidically coupled to the cold water manifold line 1126 of the cold water manifold 1120. The additive water connection 1128 can be fluidically coupled to a domestic water supply or other water source to add water to the system. Where a cold water manifold inlet 1122 is not used to circulate water or when water pressure in the system is low, the additive water connection 1128 provides additional water to the cold water manifold line 1126.

Although the cold water manifold inlet 1122 shown in FIGS. 1-4 extends from the top surface 1104 of the spine 1100, in other implementations, the cold water manifold inlet does not extend from top surface such that the cold water manifold inlet is disposed within the central portion of the spine, and the top opening provides access to the cold water manifold inlet. In other implementations, the cold water manifold outlets do not extend from the coupling areas of the spine such that the cold water manifold outlets are disposed within the central portion of the spine, and the coupling area openings provide access to the respective cold water manifold outlets. Although the spine 1100 shown in FIGS. 1-4 includes one cold water manifold line 1126 with branching cold water manifold outlets 1124 such that the cold water manifold outlets 1124 are configured in series with each other, in other implementations, the spine includes a separate cold water manifold line for each cold water manifold outlet such that the cold water manifold outlets are configured in parallel with each other.

The hot water manifold 1130 includes a hot water manifold outlet 1132 and six hot water manifold inlets 1134 fluidically coupled to each other by a hot water manifold line 1136. The hot water manifold outlet 1132 extends through one of the top openings 1106 defined by the top surface 1104, and the hot water manifold line 1136 extends through the central portion 1110 of the spine 1100. Each of the six hot water manifold inlets 1134 branch off of the hot water manifold line 1136 and extends through a coupling area opening 1118 defined by one of the coupling areas 1114 of the spine 1100.

Although the hot water manifold outlet 1132 shown in FIGS. 1-4 extends from the top surface 1104 of the spine 1100, in other implementations, the hot water manifold outlet does not extend from top surface such that the hot water manifold outlet is disposed within the central portion of the spine, and the top opening provides access to the hot water manifold outlet. In other implementations, the hot water manifold inlets do not extend from the coupling areas of the spine such that the hot water manifold inlets are disposed within the central portion of the spine, and the coupling area openings provide access to the respective hot water manifold inlets. Although the spine 1100 shown in FIGS. 1-4 includes one hot water manifold line 1136 with branching hot water manifold inlets 1134 such that the hot water manifold inlets 1134 are configured in series with each other, in other implementations, the spine includes a separate hot water manifold line for each hot water manifold inlet such that the hot water manifold inlets are configured in parallel with each other.

The fuel manifold 1140 includes a fuel manifold inlet 1142 and six fuel manifold outlets 1144 fluidically coupled to each other by a fuel manifold line 1146. The fuel manifold 1140 supplies fuel (e.g., natural gas, propane, hydrogen, or blended combustible fuels) from a fuel source to the individual water heating units 1200. The fuel manifold inlet 1142 extends through one of the top openings 1106 defined by the top surface 1104, and the fuel manifold line 1146 extends through the central portion 1110 of the spine 1100. Each of the six fuel manifold outlets 1144 branch off of the fuel manifold line 1146 and extends through a coupling area opening 1118 defined by one of the coupling areas 1114 of the spine 1100.

Although the fuel manifold inlet 1142 shown in FIGS. 1-4 extends from the top surface 1104 of the spine 1100, in other implementations, the fuel manifold inlet does not extend from top surface such that the fuel manifold inlet is disposed within the central portion of the spine, and the top opening provides access to the fuel manifold inlet. In other implementations, the fuel manifold outlets do not extend from the coupling areas of the spine such that the fuel manifold outlets are disposed within the central portion of the spine, and the coupling area openings provide access to the respective fuel manifold outlets. Although the spine 1100 shown in FIGS. 1-4 includes one fuel manifold line 1146 with branching fuel manifold outlets 1144 such that the fuel manifold outlets 1144 are configured in series with each other, in other implementations, the spine includes a separate fuel manifold line for each fuel manifold outlet such that the fuel manifold outlets are configured in parallel with each other.

The air supply manifold 1150 includes an air supply manifold inlet 1152 and six air supply manifold outlets 1152 fluidically coupled to each other by an air supply manifold line 1156. The air supply manifold 1150 supplies air from an external source to the individual water heating units 1200. The air supply manifold inlet 1152 extends through one of the top openings 1106 defined by the top surface 1104, and the air supply manifold line 1156 extends through the central portion 1110 of the spine 1100. Each of the six air supply manifold outlets 1152 branch off of the air supply manifold line 1156 and extends through a coupling area opening 1118 defined by one of the coupling areas 1114 of the spine 1100.

Although the air supply manifold inlet 1152 shown in FIGS. 1-4 extends from the top surface 1104 of the spine 1100, in other implementations, the air supply manifold inlet does not extend from top surface such that the air supply manifold inlet is disposed within the central portion of the spine, and the top opening provides access to the air supply manifold inlet. In other implementations, the air supply manifold outlets do not extend from the coupling areas of the spine such that the air supply manifold outlets are disposed within the central portion of the spine, and the coupling area openings provide access to the respective air supply manifold outlets. Although the spine 1100 shown in FIGS. 1-4 includes one air supply manifold line 1156 with branching air supply manifold outlets 1154 such that the air supply manifold outlets 1154 are configured in series with each other, in other implementations, the spine includes a separate air supply manifold line for each air supply manifold outlet such that the air supply manifold outlets are configured in parallel with each other.

The gas exhaust manifold 1160 includes a gas exhaust manifold outlet 1162 and six gas exhaust manifold inlets 1164 fluidically coupled to each other by a gas exhaust manifold line 1166. The gas exhaust manifold outlet 1162 extends through one of the top openings 1106 defined by the top surface 1104, and the gas exhaust manifold line 1166 extends through the central portion 1110 of the spine 1100. Each of the six gas exhaust manifold inlets 1164 branch off of the gas exhaust manifold line 1166 and extends through a coupling area opening 1118 defined by one of the coupling areas 1114 of the spine 1100.

Although the gas exhaust manifold outlet 1162 shown in FIGS. 1-4 extends from the top surface 1104 of the spine 1100, in other implementations, the gas exhaust manifold outlet does not extend from top surface such that the gas exhaust manifold outlet is disposed within the central portion of the spine, and the top opening provides access to the gas exhaust manifold outlet. In other implementations, the gas exhaust manifold inlets do not extend from the coupling areas of the spine such that the gas exhaust manifold inlets are disposed within the central portion of the spine, and the coupling area openings provide access to the respective gas exhaust manifold inlets. Although the spine 1100 shown in FIGS. 1-4 includes one gas exhaust manifold line 1166 with branching gas exhaust manifold inlets 1164 such that the gas exhaust manifold inlets 1164 are configured in series with each other, in other implementations, the spine includes a separate gas exhaust manifold line for each gas exhaust manifold inlet such that the gas exhaust manifold inlets are configured in parallel with each other.

The electric supply manifold 1170 includes an electric supply manifold inlet 1172 and six electric supply manifold outlets 1174 fluidically coupled to each other by an electric supply manifold line 1176. The electric supply manifold 1170 supplies electrical power from an electrical source to the individual water heating units 1200. The electric supply manifold inlet 1172 extends through one of the top openings 1106 defined by the top surface 1104, and the electric supply manifold line 1176 extends through the central portion 1110 of the spine 1100. Each of the six electric supply manifold outlets 1174 branch off of the electric supply manifold line 1176 and extends through a coupling area opening 1118 defined by one of the coupling areas 1114 of the spine 1100.

Although the electric supply manifold inlet 1172 shown in FIGS. 1-4 extends from the top surface 1104 of the spine 1100, in other implementations, the electric supply manifold inlet does not extend from top surface such that the electric supply manifold inlet is disposed within the central portion of the spine, and the top opening provides access to the electric supply manifold inlet. In other implementations, the electric supply manifold outlets do not extend from the coupling areas of the spine such that the electric supply manifold outlets are disposed within the central portion of the spine, and the coupling area openings provide access to the respective electric supply manifold outlets. Although the spine 1100 shown in FIGS. 1-4 includes one electric supply manifold line 1176 with branching electric supply manifold outlets 1174 such that the electric supply manifold outlets 1174 are configured in series with each other, in other implementations, the spine includes a separate electric supply manifold line for each electric supply manifold outlet such that the electric supply manifold outlets are configured in parallel with each other.

The condensate manifold 1180 includes a condensate manifold outlet 1182 and six condensate manifold inlets 1184 fluidically coupled to each other by a condensate manifold line 1186. The condensate manifold outlet 1182 extends through a condensate opening defined by a side surface of the spine 1100 near the base 1102, and the condensate manifold line 1186 extends through the central portion 1110 of the spine 1100. Each of the six condensate manifold inlets 1184 branch off of the condensate manifold line 1186 and extends through a coupling area opening 1118 defined by one of the coupling areas 1114 of the spine 1100.

Although the condensate manifold outlet 1182 shown in FIGS. 1-4 extends from the top surface 1104 of the spine 1100, in other implementations, the condensate manifold outlet does not extend from top surface such that the condensate manifold outlet is disposed within the central portion of the spine, and the top opening provides access to the condensate manifold outlet. In other implementations, the condensate manifold inlets do not extend from the coupling areas of the spine such that the condensate manifold inlets are disposed within the central portion of the spine, and the coupling area openings provide access to the respective condensate manifold inlets. Although the spine 1100 shown in FIGS. 1-4 includes one condensate manifold line 1186 with branching condensate manifold inlets 1184 such that the condensate manifold inlets 1184 are configured in series with each other, in other implementations, the spine includes a separate condensate manifold line for each condensate manifold inlet such that the condensate manifold inlets are configured in parallel with each other.

Each of the coupling areas 1114 includes one or more fastener openings 1116 for coupling the individual water heating units 1200 to the spine 1100, but in other implementations, the coupling areas 1114 include latches, hooks, slides, guides, pins, or any other means of fastening the individual water heating units 1200 to the coupling areas 1114 of the spine 1100.

Each of the six individual water heating units 1200 include a water heater 1202 coupled to a back panel 1210. The back panel 1210 defines one or more fastener openings 1216 that are alignable with the fastener openings 1116 defined by the coupling areas 1114 of the spine 1100 such that fasteners can extend through the aligned fastener openings 1116, 1216 to couple the water heating units 1200 to the spine 1100.

The back panels 1210 also include one or more back panel openings 1218 that are alignable with corresponding coupling area openings 1118 when the water heating units 1200 are coupled to the coupling areas 1114 of the spine 1100. When the back panel openings 1218 are aligned with the coupling area openings 1118, each of the cold water manifold outlet 1124, hot water manifold inlet 1134, fuel manifold outlet 1144, air supply manifold outlet 1154, gas exhaust manifold inlet 1164, electric supply manifold outlet 1174, and condensate manifold inlet 1184 extend through one of the one or more back panel openings 1218.

Each of the water heating units 1200 also includes a cover panel 1290 removably coupled to the back panel 1210. Each of the cover panels 1290 is formed separately from the cover panels 1290 of the other water heating units 1200. The cover panels 1290 can include water heating unit controllers 1292 for controlling the respective water heating unit 1200, a group of water heating units 1200, and/or all of the water heating units 1200 of the system 1000. In some implementations, the water heating unit controllers 1292 of each of the water heating units 1200 may be networked together and/or to one or more networking hubs or switches, including a building management system ("BMS") and/or a BMS gateway (not shown).

The BMS gateway comprises a water heater hub and a BMS router. The water heater hub facilitates local networking of the water heating units 1200 and translation of water heater information to a format usable by the BMS router. The BMS router in turn facilitates communication of status and control data between the BMS and the water heating units 1200 connected to the water heater hub. The user interface on one of the cover panels 1290 can act as a BMS user interface (UI) for locally facilitating secure access, display, and/or adjustment of water heater status and control data for each of the water heating units 1200 connected to the BMS gateway. Examples of the BMS gateway and BMS UI are described in more detail in commonly owned U.S. patent application Ser. No. _____, titled "Water Heater Building Management System Gateway", filed concurrently herewith, hereby incorporated by reference in its entirety.

Each of the water heaters 1202 includes a heat exchanger 1204, a combustion chamber 1206, a cold water inlet 1220, a hot water outlet 1230, a fuel inlet 1240, an air inlet 1250, a gas exhaust outlet 1260, an electrical inlet 1270, and a condensate outlet 1280. The cold water inlet 1220 of each of the water heaters 1202 is fluidically coupled to the cold water manifold outlet 1124 of the coupling area 1114 to which it is mounted and to the heat exchanger 1204. The hot water outlet 1230 of each of the water heaters 1202 is fluidically coupled to the hot water manifold inlet 1134 of the coupling area 1114 to which it is mounted and to the heat exchanger 1204. The fuel inlet 1240 of each of the water heaters 1202 is fluidically coupled to the fuel manifold outlet 1144 of the coupling area 1114 to which it is mounted and to the combustion chamber 1206. The air inlet 1250 of each of the water heaters 1202 is fluidically coupled to the air supply manifold outlet 1154 of the coupling area 1114 to which it is mounted and to the combustion chamber 1206. The gas exhaust outlet 1260 of each of the water heaters 1202 is fluidically coupled to the gas exhaust manifold inlet 1164 of the coupling area 1114 to which it is mounted and to the combustion chamber 1206. The electrical inlet 1270 of each of the water heaters 1202 is electrically coupled to the electric supply manifold 1170 of the coupling area 1114 to which it is mounted and to the water heating unit controller 1292. The condensate outlet 1280 of each of the water heaters 1202 is fluidically coupled to the condensate manifold inlet 1184 of the coupling area 1114 to which it is mounted and to the combustion chamber 1206.

Although the system 1000 shown in FIGS. 1-4 include a cold water manifold outlet 1124, hot water manifold inlet 1134, fuel manifold outlet 1144, air supply manifold outlet 1154, gas exhaust manifold inlet 1164, electric supply manifold outlet 1174, and condensate manifold inlet 1184 that extend through one of the one or more back panel openings 1218, in other implementations, any number of these manifold outlets and inlets are disposed within the interior of the spine 1100, and the corresponding cold water inlet 1220, hot water outlet 1230, fuel inlet 1240, air inlet 1250, gas exhaust outlet 1260, electrical inlet 1270, and condensate outlet 1280 extend through their respective back panel openings 1218 and coupling area openings 1118 and into the spine 1100 to couple to the manifold outlets and inlets.

Each of the water heating units 1200 shown in FIGS. 1-4 is rated for less than 200,000 BTU/hr. According to ASME HLW-101(a)(1), any potable water heaters that exceed an input greater than 200,000 BTU/hr are subject to the requirements of Part HLW for potable water heaters. Thus, while the entire system 1000 shown in FIGS. 1-4 is rated for providing around 1.2 MBTU of heat, the requirements of ASME Part HLW do not apply to the system 1000 because each of the individual units is rated for less than 200,000 BTU/hr of heating.

In use, water flows from the cold water manifold inlet 1122, through the cold water manifold line 1126, to each of the cold water manifold outlets 1124. Where a cold water manifold inlet 1122 is not used to circulate water or when water pressure in the system is low, the additive water connection 1128 provides additional water to the cold water manifold line 1126. The water then flows from each of the cold water manifold outlets 1124, into the cold water inlets 1220 of the respective water heaters 1202, and through a heat exchanger 1204 of the water heaters 1202.

Fuel, such as natural gas, flows from the fuel manifold inlet 1142, through the fuel manifold line 1146, to each of the fuel manifold outlets 1144. The fuel then flows from each of the fuel manifold outlets 1144, into the fuel inlets 1240 of the respective water heaters 1202, and into a combustion chamber 1206 in the heat exchanger 1204 of the water heaters 1202.

Air flows from the air supply manifold inlet 1152, through the air supply manifold line 1156, to each of the air supply manifold outlets 1152. The air then flows from each of the air supply manifold outlets 1152, into the air inlets 1250 of the respective water heaters 1202, and into a combustion chamber 1206 in the heat exchanger 1204 of the water heaters 1202.

The electric supply manifold 1170 supplies electricity to the electrical inlet 1270 of the water heater 1202, and the electricity flows through a water heating unit controller 1292. The water heating unit controller 1292 causes the combustion chamber 1206 to ignite the fuel within the combustion chamber 1206 of the heat exchanger 1204. The heat generated by combusting fuel inside each of the water heaters 1202 transfers heat through the heat exchanger 1204 to the water supplied to the water heater 1202 by the cold water manifold 1120.

The water that has been heated in the heat exchanger 1204 flows from the heat exchanger 1204, through the hot water outlet 1230 of the water heater 1202, to the respective hot water manifold inlet 1134. The water then flows to the hot water manifold line 1136 and out of the hot water manifold outlet 1132 in the top surface 1104 of the spine 1100 so that it can be directed to one or more hot water fixtures.

The buoyant hot exhaust gases created as a byproduct of the combustion of the fuel flows upwardly from the heat exchanger 1204, through the gas exhaust outlet 1260 of the water heater 1202, to the respective gas exhaust manifold inlet 1164. The exhaust gases then flow to the gas exhaust manifold line 1166 and out of the gas exhaust manifold outlet 1162 in the top surface 1104 of the spine 1100 so that it can be directed exterior to the building structure.

The condensate created as a byproduct of the combustion of the fuel drains from the heat exchanger 1204, through the condensate outlet 1280 of the water heater 1202, to the respective condensate manifold inlet 1184. The condensate then flows to the condensate manifold line 1186 and out of the condensate manifold outlet 1182 so that it can be directed exterior to the building structure.

Although the implementation of the hot water heating system 1000 shown in FIGS. 1-4 includes water heaters 1202 that are configured to use combustion of a fuel source to heat water, in other implementations, the water heaters 2202 are configured to use electricity to heat water. In these implementations, each of the water heaters 2202 includes at least one electric resistance heating element 2204 to heat water. The spine 2100 in these implementations include a cold water manifold 2120, a hot water manifold 2130, and an electric supply manifold 2170 like in the implementation shown in FIGS. 1-4, but because fuel combustion is not being used, the spine 2100 does not include an air supply manifold, a gas exhaust manifold, a fuel manifold, or a condensate manifold.

Each of the water heaters 2202 includes a heat exchanger 2204, a cold water inlet 2220, a hot water outlet 2230, and an electrical inlet 2270. The cold water inlet 2220 of each of the water heaters 2202 is fluidically coupled to the cold water manifold outlet 2124 of the coupling area 2114 to which it is mounted. The hot water outlet 2230 of each of the water heaters 2202 is fluidically coupled to the hot water manifold inlet 2134 of the coupling area 2114 to which it is mounted. The electrical inlet 2270 of each of the water heaters 2202 is electrically coupled to the electric supply manifold 2170 of the coupling area 2114 to which it is mounted.

Water flows from the cold water manifold inlet 2122, through the cold water manifold line 2126, to each of the cold water manifold outlets 2124. Where a cold water manifold inlet 2122 is not used to circulate water or when water pressure in the system is low, the additive water connection 2128 provides additional water to the cold water manifold line 2126. The water then flows from each of the cold water manifold outlets 2124, into the cold water inlets 2220 of the respective water heaters 2202, and through a heat exchanger 2204 of the water heaters 2202.

The electric supply manifold 2170 supplies electricity to the electrical inlet 2270 of the water heater 2202, and the electricity flows through the electric resistance heating element 2204 within the heat exchanger 2204. The heat generated by the electric resistance heating element 2204 inside of each of the water heaters 2202 transfers heat through the heat exchanger 2204 to the water supplied to the water heater 2202 by the cold water manifold 2120.

The heated water then flows from the heat exchanger 2204, through the hot water outlet 2230 of the water heater 2202, to the hot water manifold inlet 2134. The water then flows to the hot water manifold line 2136 and out of the hot water manifold outlet 2132 in the top surface 2104 of the spine 2100 so that it can be directed to one or more hot water fixtures.

A number of implementations have been described. Nevertheless, it will be understood that various modifications may be made without departing from the spirit and scope of the claims. Accordingly, other implementations are within the scope of the following claims.

Certain terminology is used herein for convenience only and is not to be taken as a limitation on the present claims. In the drawings, the same reference numbers are employed for designating the same elements throughout the several figures. A number of examples are provided, nevertheless, it will be understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A hot water heating system, the system comprising:
a spine defining a top surface and including:

two or more coupling areas for coupling a water heating unit to the spine, each of the coupling areas including a cold water manifold outlet, a hot water manifold inlet, and a fuel manifold outlet, a cold water manifold comprising a cold water manifold inlet extending through the top surface of the spine and fluidically coupled to the cold water manifold outlet of each coupling area, a hot water manifold comprising a hot water manifold outlet extending through the top surface of the spine and fluidically coupled to the hot water manifold inlet of each coupling area, and a fuel manifold comprising a fuel manifold inlet in communication with the fuel manifold outlet of each coupling area, wherein at least one of the coupling areas is located above another coupling area when the spine is oriented with the top surface facing upwardly; and two or more water heating units, wherein each of the water heating units is coupled to one of the coupling areas.

2. The system of claim 1, wherein the top surface of the spine defines one or more top openings that provide access to the cold water manifold inlet, the hot water manifold outlet, and the fuel manifold inlet.

3. The system of claim 1, wherein each water heating unit includes
a cold water inlet fluidically coupled to the cold water manifold outlet at a corresponding one of the coupling areas,
a hot water outlet fluidically coupled to the hot water manifold inlet at the corresponding one of the coupling areas, and
a fuel inlet fluidically coupled to the fuel manifold outlet at the corresponding one of the coupling areas.

4. The system of claim 1, wherein the spine includes two coupling surfaces, wherein each of the two coupling surfaces defines at least two coupling areas.

5. The system of claim 1, wherein each water heating unit includes a back panel coupled to one of the coupling areas,
wherein the back panel defines one or more openings configured such that each of the one or more openings provides access to one or more of the cold water manifold outlet, the hot water manifold inlet, and the fuel manifold outlet of the corresponding one of the coupling areas.

6. The system of claim 5, wherein each water heating unit includes a cover panel coupled to the back panel, the cover panel being formed separately from the cover panels of the other water heating units.

7. The system of claim 1, wherein the spine further includes:
an air supply manifold comprising an air supply manifold inlet fluidically coupled to an air supply manifold outlet of each coupling area, and
a gas exhaust manifold comprising a gas exhaust manifold outlet fluidically coupled to a gas exhaust manifold inlet of each coupling area; and
wherein each water heating unit further includes:
an air inlet fluidically coupled to the air supply manifold outlet at a corresponding one of the coupling areas, and
a gas exhaust outlet fluidically coupled to the gas exhaust manifold inlet at a corresponding one of the coupling areas.

8. The system of claim 1, wherein the spine further includes an electric supply manifold comprising an electric manifold inlet and adapted to provide electrical power to each coupling area,
wherein each water heating unit is configured to be electrically coupled to the electric supply manifold at a corresponding one of the coupling areas.

9. The system of claim 1, wherein the spine further includes:
a condensate manifold comprising a condensate manifold outlet fluidically coupled to a condensate manifold inlet of each coupling area; and
wherein each water heating unit further includes:
a condensate outlet fluidically coupled to the condensate manifold inlet at a corresponding one of the coupling areas.

10. The system of claim 1, wherein the two or more coupling areas comprises two coupling areas.

11. The system of claim 1, wherein the two or more coupling areas comprises three coupling areas.

12. The system of claim 1, wherein the two or more coupling areas comprises four coupling areas.

13. The system of claim 1, wherein the two or more coupling areas comprises five coupling areas.

14. The system of claim 1, wherein the two or more coupling areas comprises six coupling areas.

15. The system of claim 1, wherein each of the two or more water heating units is rated for less than 200,000 BTU.

16. A method of assembling a hot water heating system, the method comprising:
mounting a spine to a floor or wall, the spine defining a top surface and including:
two or more coupling areas for coupling a water heating unit to the spine, each of the coupling areas including a cold water manifold outlet, a hot water manifold inlet, and a fuel manifold outlet,
a cold water manifold comprising a cold water manifold inlet extending through the top surface of the spine and fluidically coupled to the cold water manifold outlet of each coupling area,
a hot water manifold comprising a hot water manifold outlet extending through the top surface of the spine and fluidically coupled to the hot water manifold inlet of each coupling area, and
a fuel manifold comprising a fuel manifold inlet fluidically coupled to the fuel manifold outlet of each coupling area,
wherein at least one of the coupling areas is located above another coupling area when the spine is oriented with the top surface facing upwardly;
fluidically coupling the cold water manifold inlet to a cold water supply source;
fluidically coupling the hot water manifold outlet to a hot water supply source;
fluidically coupling the fuel manifold inlet to a fuel supply source; and
coupling two or more water heating units to the spine, each of the water heating units coupled to one of the coupling areas.

17. The method of claim 16, wherein the top surface defines one or more top openings that provide access to the cold water manifold inlet, the hot water manifold outlet, and the fuel manifold inlet.

18. The method of claim 16, wherein each water heating unit includes a cold water inlet fluidically coupled to the cold water manifold outlet at a corresponding one of the coupling areas, a hot water outlet fluidically coupled to the hot water manifold inlet at the corresponding one of the coupling areas, and a fuel inlet fluidically coupled to the fuel manifold outlet at the corresponding one of the coupling areas.

\* \* \* \* \*